United States Patent
Forck et al.

(10) Patent No.: US 10,128,977 B2
(45) Date of Patent: Nov. 13, 2018

(54) TRANSMITTING A FIRST AND A SECOND CHANNEL QUALITY INFORMATION BETWEEN TWO NETWORK ELEMENTS

(75) Inventors: Andreas Forck, Falkensee (DE); Thomas Haustein, Potsdam (DE); Volker Jungnickel, Berlin (DE); Malte Schellmann, Munich (DE); Lars Thiele, Berlin (DE); Thomas Wirth, Berlin (DE)

(73) Assignees: Fraunhofer-Gesellschaft zur foerderung der angewandten Forschung e.V., Munich (DE); Nokia Siemens Networks GmbH & Co. KG, München (DE)

( * ) Notice: Subject to any disclaimer, the term of this patent is extended or adjusted under 35 U.S.C. 154(b) by 1362 days.

(21) Appl. No.: 13/144,577

(22) PCT Filed: Jan. 15, 2009

(86) PCT No.: PCT/EP2009/050421
§ 371 (c)(1),
(2), (4) Date: Aug. 26, 2011

(87) PCT Pub. No.: WO2010/081552
PCT Pub. Date: Jul. 22, 2010

(65) Prior Publication Data
US 2011/0305154 A1    Dec. 15, 2011

(51) Int. Cl.
*H04L 1/00* (2006.01)
*H04W 28/24* (2009.01)
*H04W 52/24* (2009.01)

(52) U.S. Cl.
CPC .......... *H04L 1/0026* (2013.01); *H04L 1/0023* (2013.01); *H04L 1/0029* (2013.01); *H04W 28/24* (2013.01); *H04W 52/24* (2013.01)

(58) Field of Classification Search
CPC ...... H04W 28/24; H04W 52/24; H04L 1/0023
See application file for complete search history.

(56) References Cited

U.S. PATENT DOCUMENTS

2004/0057394 A1    3/2004    Holtzman ............... 370/317
2007/0259671 A1    11/2007   Cheng et al. ........... 455/452.2
(Continued)

FOREIGN PATENT DOCUMENTS

EP    1 274 208 A1    1/2003

OTHER PUBLICATIONS

Pedersen, K.I., et al., "Frequency Domain Scheduling for OFDMA with Limited and Noisy channel Feedback", © 2007 IEEE, 5 pgs.
(Continued)

*Primary Examiner* — Christopher M Crutchfield
(74) *Attorney, Agent, or Firm* — Harrington & Smith (57) ABSTRACT

It is described a method for transmitting channel quality information between a second network element and a first network element. The method comprises includes (a) dividing a range of possible radio channel qualities between the two network elements into a fixed number of quality classes, (b) measuring the quality of a radio channel between the two network elements, (c) selecting one quality class out of the fixed number of quality classes based on the measured quality of the radio channel, (d) transmitting from the second network element to the first network element a first channel quality information being indicative for the selected quality class, and (e) transmitting from the second network element to the first network element a second channel quality information being indicative for the measured quality within the limits of the selected quality class. It is further described the first and the second network element, which in conjugation with each other are adapted to carry out the described method.

15 Claims, 2 Drawing Sheets

(56) References Cited

U.S. PATENT DOCUMENTS

2008/0165697 A1* 7/2008 Zeira et al. .................... 370/252
2009/0141648 A1* 6/2009 Imamura et al. .............. 370/252
2009/0233614 A1* 9/2009 Sousa et al. ................... 455/450

OTHER PUBLICATIONS

Jungnickel, V., et al., "Feedback Design for Multi-User MIMO Systems", Aug. 2008, 13$^{th}$ International OFDM-Workshop (InOWo), Hamburg, Germany 5 pgs.

Zheng,L., et al., "Diversity and Multiplexing: A Fundamental Tradeoff in Multiple-Antenna Channels", © 2003 IEEE, 24 pgs.

* cited by examiner

—o— cell throughput, single-cell measurement
—□— cell throughput, multi-cell simulation
—●— cell-edge throughput, single-cell measurement
—▨— cell-edge throughput, multi-cell measurement

TRANSMITTING A FIRST AND A SECOND CHANNEL QUALITY INFORMATION BETWEEN TWO NETWORK ELEMENTS

FIELD OF INVENTION

The present invention generally relates to the field of 3rd generation partnership project (3GPP) telecommunication networks, wherein network element such as base stations and mobile user equipments communicate with each other based on the principles of multi antenna communication techniques including the so called Multiple Input Multiple Output (MIMO) communication technique. In particular, the present invention relates to a method for transmitting channel quality information between a second network element and a first network element of a radio telecommunication network. Further, the present invention relates to a first and to a second network element, which in conjugation with each other are adapted to carry out the described channel quality information transmitting method. Furthermore, the present invention relates to a computer program, which, when being executed by a data processor, is adapted for controlling the described channel quality information transmitting method.

ART BACKGROUND

Multiple antennas are an important means to improve the performance of wireless telecommunication systems. It is widely understood that in a system with multiple transmit and receive antennas (Multiple-Input-Multiple-Output (MIMO) channel), the spectral efficiency is much higher than the spectral efficiency of conventional single-antenna channels.

Traditionally, multiple antennas have been used to increase diversity to combat channel fading. In case of a so called 2×2 MIMO system, wherein both the transmitter and the receiver comprises two antennas, each pair of transmit and receive antennas provides a signal path from the transmitter to the receiver. By sending signals that carry the same information through different paths, multiple independently faded replicas of one and the same data symbol can be obtained at the receiver end. Thereby, a more reliable reception can be achieved. The corresponding data transmission mode, wherein a single data stream is transmitted over a MIMO channel comprising different radio transmission paths is called (single stream) diversity mode.

However, in particular if the quality of the radio link between the transmitter and the receiver is quite good, independent information can be transmitted via different channels of a MIMO connection between the transmitter and the receiver. By transmitting independent information streams in parallel through different spatial MIMO channels, the data rate can be increased. This effect is also called spatial multiplexing.

In summary, a MIMO system can provide two types of gains with respect to a data throughput between the transmitter and the receiver: a diversity gain and a spatial multiplexing gain. Therefore, a proper spatial transmit mode selection is a key concept for MIMO communication systems.

In the publication by L. Zheng and D. Tse "Diversity and Multiplexing: A Fundamental Tradeoff in Multiple-Antenna Channels", IEEE Transactions on Information Theory, vol. 49, no. 5, pp. 1073-1096, May 2003 it has been proposed to combine the diversity gain and the spatial multiplexing gain with each other. There is an elementary trade-off between diversity and spatial multiplexing for MIMO radio communication systems. When combining a diversity transmission mode with a spatial multiplexing transmission mode, out of the total resource of transmitting and receiving antennas r transmitting and r receiving antennas can be used for data transmissions by means of spatial multiplexing of m data streams being transmitted simultaneously. The remaining r-m transmitting and r-m receiving antennas can be used for increasing the diversity of the data transmission. The diversity-multiplexing tradeoff is essentially the tradeoff between the error probability and the data rate of a MIMO radio communication system.

The major task of the medium access layer (MAC layer) in a MIMO radio communication system is to operate the multi-antenna radio link in the right balance between diversity and multiplexing. Therefore, one observes the time- and frequency-selective channel and interference conditions at the receiving user equipment (UE) and feeds this information back to the transmitting base station (BS) on a regular basis. In order to reduce the amount of feedback to be transmitted, the UE only feeds back channel quality information (CQI) on its m best radio transmission resources, which are also called physical resource blocks (PRB). The corresponding CQI for the m best PRB's are called top-m-CQI. The CQI is quantized by taking the signal to interference and noise ratio (SINR) of the respective MIMO channel into account. The BS decides upon the received CQI value on the modulation and coding scheme (MCS) to be used for a given PRB.

In this application a feedback design for the integration of multi-user MIMO in cellular mobile radio communication systems will be considered. The feedback is given by the UE's, which report beam indices referring to a set of fixed pre-coding beams and the corresponding SINR for different supported spatial transmission modes. In this respect a set of fixed pre-coding beams is defined by an orthogonal set of beamforming vectors each corresponding to a spatial electromagnetic radiation pattern. Thereby, the number of all beamforming vectors represents the number of possible radio reception alternatives for a UE. Out of the total number of radio reception alternatives a UE may select one allowing for the best radio connection quality.

In known MIMO telecommunication systems a CQI feedback is calculated for each spatial radio transmission mode and for each PRB at the UE. In the following a 2×2 MIMO communication system is considered, which means that both BS and UE have two transmitting/receiving antennas. The effective per beam SINRs are calculated for single-stream and for dual-stream transmissions. A full feedback system therefore requires three CQI values for each PRB in a system with two serving beams: two CQI values for the dual-stream case and one CQI value for the single-stream case. In this respect it is noted that in the case of single-stream data transmission, only (a) the higher CQI value corresponding to the beam pattern/beamforming vector providing for the better radio connection and (b) an identifier identifying the better beam pattern/beamforming have to be fed back from the UE to the BS. For a full flexibility at the BS both CQI values have to be fed back.

It can be easily understood that with a growing number of transmitting/receiving antennas the amount of CQI feedback information grows and, if the number of scheduled PRBs per UE is high, the resulting feedback overhead within a MIMO radio telecommunication system may become quite large.

Current third generation (3G)-MIMO-telecommunication networks relying on Orthogonal Frequency Division Multiplex (OFDM) such as for instance 3G-Long Term Evolution (LTE) networks or Worldwide Interoperability for Microwave Access (WiMAX) networks support a fixed quantization scheme for providing the feedback information between the UE and the BS. As a consequence the number of CQI feedback bits can only be reduced by (a) taking a coarser quantization scheme and/or by (b) a reduction of the parameter m defining the number of the best radio transmission resources (the number of the top-m-CQI is reduced).

Figure 3:
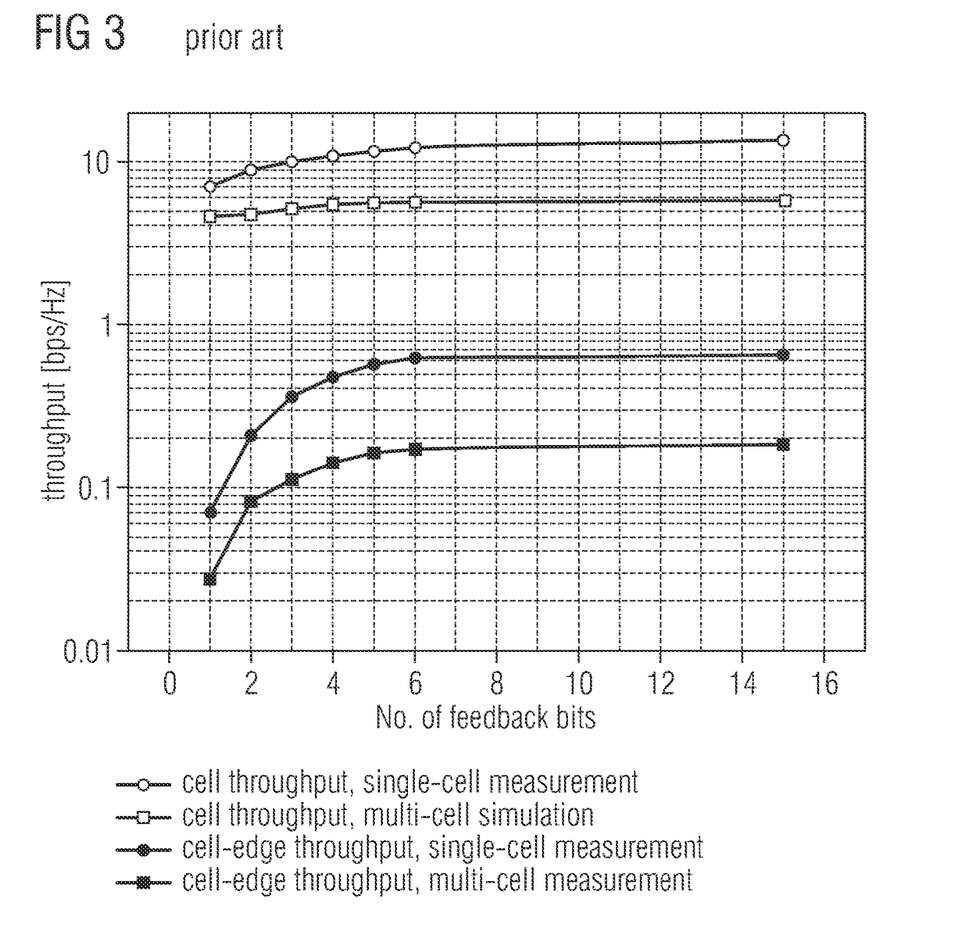
FIG. 3 shows a prior art diagram depicting the spectral data throughput for average user equipments and for cell-edge user equipments (5-percentile) as a function of the number of bits which are used for the channel quality information.

(a) Taking a coarser quantization scheme would result in a large system performance decrease especially for UEs being located at the cell-edge. This has been shown in the publication by V. Jungnickel, L. Thiele, T. Wirth, M. Schellmann, T. Haustein, V. Venkatkumar, "Feedback Design for Multi-User MIMO Systems", 13th International OFDM-Workshop (InOWo), Hamburg, Germany, August 2008. FIG. 3, which is taken from that publication, depicts the spectral data throughput (in bits per second per hertz) as a function of the number of bits which number is used for a feedback CQI.

The circles show measurement results which have been obtained for a telecommunication network comprising only one cell. The squares show simulation results for a multi-cell telecommunication network.

The open circles and squares show the spectral data throughput averaged over all UEs, i.e. UEs being located at the cell edge and UEs being located within the center of the cell. The full circles and squares show the spectral data throughput specifically for those UEs which are located at the cell edge and which typically have a comparatively small SNIR radio connection to their serving base station.

It can be seen from FIG. 3 that for cell-edge UEs, which usually suffer from a comparatively low SINR, at least 5 feedback bits are necessary for an adequate cell-edge UE support. If 5 bits are used for feedback quantization, 2 bits can be used for a modulation mode quantization, e.g. no modulation at all, Quadrature Phase Shift Keying (QPSK), 16-quadrature amplitude modulation (QAM), 64-QAM, and the code rate can be quantized with remaining 3 bits.

It can be further seen from FIG. 3 that when averaging over cell-edge UEs and center UEs the spectral data throughput is much less sensitive to the number of bits used for the CQI.

(b) A reduction of m in the top-m-CQI results in less PRBs that can be scheduled to a UE. As a consequence there is a strong performance decrease for the UE.

There may be a need for reducing the feedback overhead in a radio telecommunication network.

SUMMARY OF THE INVENTION

This need may be met by the subject matter according to the independent claims. Advantageous embodiments of the present invention are described by the dependent claims.

According to a first aspect of the invention there is provided a method for transmitting channel quality information between a second network element and a first network element of a radio telecommunication network. The provided method comprises (a) dividing a range of possible radio channel qualities between the two network elements into a fixed number of quality classes, (b) measuring the quality of a radio channel between the two network elements, (c) selecting one quality class out of the fixed number of quality classes based on the measured quality of the radio channel, (d) transmitting from the second network element to the first network element a first channel quality information being indicative for the selected quality class, and (e) transmitting from the second network element to the first network element a second channel quality information being indicative for the measured quality within the limits of the selected quality class.

The described channel quality reporting method is based on the idea that channel quality information can be reported in an effective manner by using an iterative concept. Thereby, firstly a coarse first channel quality information is reported, which represents a first rough estimation of the measured radio channel quality. Secondly, a comparative fine second channel quality information is reported, which indicates at least approximately the measured radio channel quality within the framework of the selected and in the meantime already reported quality class.

The possible radio channel quality range may be defined by possible values of a Signal to Noise Ratio (SNR) and/or of a Signal to Interference and Noise Ratio (SINR). This may provide the advantage that usual measures for characterizing the quality of a radio link respectively the quality of a radio channel can be used for accomplishing the described method.

The fixed number of quality classes may be for instance 2, 4, 8, etc. However, also other numbers, which are not given by a power of two, may be used for subdividing the range of possible radio channel qualities.

According to an embodiment of the invention the second information comprises a quality resolution within the limits of the selected quality class, whereby the quality resolution depends on the selected quality class. This may mean that the effective preciseness of the transmitted channel quality information comprising both the first and the second channel quality information depends on the (measured) quality of the radio channel between the two network elements. This allows for an adaptive selection of the quality resolution respectively of the granularity of the finally reported channel quality information. If there is no need to report the quality of the radio channel extending between the first and the second network element very precisely, a comparative coarse quality resolution can be used. Since of course comparative imprecise channel quality information require a smaller amount of feedback bits than comparative accurate channel quality information, the feedback overhead within a telecommunication network can be reduced significantly.

According to a further embodiment of the invention, for a first measured radio channel quality, which is poorer than a second measured radio channel quality, the quality resolution is higher than the quality resolution for the second measured radio channel quality. This may provide the advantage that for a low quality radio channel, wherein the selection of a proper Modulation and Coding Scheme (MCS) is much more critical than for a high quality channel, a precise channel quality information will be reported. Based on the precise channel quality information an optimal MCS can be selected. By contrast thereto, for a high quality radio channel, as it is depicted in FIG. 3, the overall data throughput depends only weakly on the quality resolution respectively on the number of feedback bits used for the Channel Quality Information (CQI). Therefore, one can reduce the feedback signaling overload significantly by using a poorer quality resolution without reducing the data throughput because of a not perfectly selected MCS.

In case of a multi user scenario the resolution, which is depending on the quality of the respective radio channel, may be different for different second network elements being connected to the first network element via different quality radio channels. Therefore, different feedback information having different data volumes can be transmitted from different second network elements to the first network element. By contrast to known feedback scenarios, wherein each second network element uses the same coarse feedback quantization, in the described method the feedback quantization may be user specific.

According to a further embodiment of the invention the method further comprises transmitting from the second network element to the first network element at least one further second channel quality information being indicative for the measured quality within the limits of the selected quality class. Thereby, each further second channel quality information represents a different radio transmission resource.

In this context it is pointed out that for transmitting data via a radio link between two network elements an appropriate radio transmission resource has to be provided. Typically, for the data transfer the overall available radio transmission resource is subdivided into a plurality of minimum of radio transmission resource units. This minimum unit may be called a physical resource block (PRB), a chunk and/or a slot. The minimum unit may be illustrated as a two-dimensional element within a coordinate system having a time-axis and a frequency-axis.

Transmitting further second quality information may provide the advantage that feedback information may be provided to the first network element in a PRB selective manner. Since also the further second channel quality information is/are provided within the quality limits of the selected quality class the further channel quality information can be transmitted in an effective manner with respect to the amount of data, which has to be transmitted from the second to the first network element.

According to a further embodiment of the invention the second channel quality information and the further second channel quality information are assigned to a predefined number of the best radio transmission resources between the two network elements.

In particular, at least one of the first network element and the second network element may support the well known multiple-input-multiple-output (MIMO) technology. As a consequence, between the two network elements different spatial radio channels develop. Each radio channel may provide for a different radio transmission quality.

Specifically, the second channel quality information and the further second channel quality information may be associated to the known top-m-CQI. Thereby, m corresponds to the predefined number.

The second network element may decide for a quality class (CQI class) according to its measured SINR and quantize its top-m-CQI values according to the specified CQI quantization table of the particular quality class. Since typically the top-m-CQI of the best radio channels are fed back to the first network element, all CQI values, which are supposed to be fed back, belong to the same quality class. Therefore, by contrast to known CQI feedback procedures less bits can be used for the CQI quantization and a fixed number of bits can be used to feed back the quantization class.

The large reduction in the amount of feedback data predominantly results from the fact, that the quality class is the same for all CQI values of a particular second network element. The second network element only has to transmit the small amount of bits indicating the feedback class respectively the quality class once.

According to a further embodiment of the invention the step of dividing a range of possible radio channel qualities between the two network elements into a fixed number of quality classes is performed by the first network element.

Further, the method further comprises signaling a classification resulting from the performed division from the first network element to the second network element.

The described signaling may be carried out via any suitable control channel, feedback channel and/or data channel. In particular, the signaling may be carried out via downlink control channel. The first network element may also signal the number of bits to use for CQI quantization for a particular quality class.

According to a further embodiment of the invention selecting one quality class out of the fixed number of quality classes based on the measured quality of the radio channel is performed by the second network element. In other words, the first network element defines the general classification respectively the segmentation of the range of possible radio channel qualities and the second network element selects a proper quality class for the CQI.

According to a further embodiment of the invention (a) dividing a range of possible radio channel qualities between the two network elements into a fixed number of quality classes is performed by the second network element and (b) selecting one quality class out of the fixed number of quality classes based on the measured quality of the radio channel is performed by the second network element. In other words, the second network element chooses the classification granularity itself. Preferably, the chosen classification depends on the current SINR conditions between the two network elements.

This approach may reduce the required amount of data being associated with the feedback information from the second to the first network element further. This holds in particular if the variance of the majority of the top-m-CQI values is small. If this is the case, i.e. especially for users experiencing a frequency-flat channel, the second network elements can choose a quality class (CQI class) which uses less bits for encoding a proper Modulation and Coding (MCS) scheme.

In this respect it is pointed out that encoding of the CQI class requires more bits in this case, but since the CQI class only has to be signaled once for the whole frequency band, the overall amount of feedback data can be reduced. Additionally it is mentioned that in a multi user scenario different second network elements are allowed to choose a different CQI class granularity. Thereby, the CQI class granularity corresponds to the above mentioned quality resolution.

According to a further embodiment of the invention the method further comprises (a) assigning a modulation mode quantization scheme to the selected quality class and/or (b) assigning a code rate to the to the selected quality class. In combination, the assigned modulation mode quantization scheme and the assigned code rate may represent a modulation and coding scheme.

The modulation mode quantization scheme may be for instance a Binary Phase Shift Keying (BPSK), a Quadrature Phase Shift Keying (QPSK), a 16-quadrature amplitude modulation (QAM) or a 64-QAM.

The assigned code rate may be for instance any value between ½ and 1. Thereby, the code rate r is defined by the ratio between (a) the number N of real data bits and (b) the sum of the number K of redundancy bits and the number N of real data bits ($r=N/(N+K)$). Therefore, a code rate of ½ means that N=K. Correspondingly, a code rate of "one" means that there are no redundancy bits at all (N=0).

It has to be mentioned that also more than one modulation mode quantization scheme and/or more than one code rate can be assigned to the selected quality class. This may provide the advantage that the corresponding MCS scheme can be adapted not only to the selected quality class but also precisely to the specific value of measured quality.

It has to be further mentioned that appropriate modulation mode quantization schemes and/or appropriate code rates can also be assigned to the other quality classes, which may not have been selected for a successive radio data transmission. Preferably, at least one appropriate modulation mode quantization scheme and/or at least one appropriate code rate is assigned to each of the fixed number of quality classes.

Of course, based on the measured quality of the radio channel an appropriate modulation mode quantization scheme and/or an appropriate code rate will be used for successive radio data transmissions between the two network elements.

According to a further embodiment of the invention (a) the first network element is a base station of the radio telecommunication network and/or (b) the second network element is a user equipment of the radio telecommunication network.

The described method may be carried out in any telecommunication network, wherein user equipments, which are located within a specific cell, are served by a base station, which spans the specific cell.

The base station (BS) may be any network-sided radio station, (a) which receives user data and/or signaling data from a subscriber terminal respectively a user equipment and/or (b) which transmits user data and/or signaling data to a subscriber terminal respectively a user equipment. The BS may be connected via network-sided elements with a core network. The core network may be used to connect the served user equipment to other radio telecommunication systems and/or to other data networks. The data network may be for instance the internet or a fixed network comprising packet-switched and/or circuit-switched connections for instance for voice and/or data service.

The user equipment (UE) may be any type of communication end device, which is capable of connecting with an arbitrary telecommunication network access point such as a base station or a relay node. In particular the UE may be a cellular mobile phone, a Personal Digital Assistant (PDA), a notebook computer and/or any other movable communication device.

According to a further aspect of the invention there is provided a first network element for receiving channel quality information from a second network element. The first network element comprises (a) a first unit for receiving from the second network element a first channel quality information being indicative for a selected quality class, which has been selected from a fixed number of quality classes based on a measured quality of a radio channel between the two network elements, wherein a range of possible radio channel qualities between the two network elements is divided into the fixed number (n) of quality classes, and (b) a second unit for receiving from the second network element a second channel quality information being indicative for the measured quality within the limits of the selected quality class.

According to a further aspect of the invention there is provided a second network element for transmitting channel quality information to a first network element. The second network element comprises (a) a first unit for transmitting to the first network element a first channel quality information being indicative for a selected quality class, which has been selected from a fixed number of quality classes based on a measured quality of a radio channel between the two network elements, wherein a range of possible radio channel qualities between the two network elements is divided into the fixed number of quality classes, and (b) a second unit for transmitting to the first network element a second channel quality information being indicative for the measured quality within the limits of the selected quality class.

These further aspects are based on the idea that channel quality information can be reported in an efficient manner from the second to the first network elements by using an iterative concept. Firstly, a coarse first channel quality information is reported, which represents a first rough estimation of the measured radio channel quality. Secondly, a comparatively fine second channel quality information is reported, which indicates at least approximately the measured radio channel quality within the framework of the selected and in the meantime already reported quality class.

As has already been mentioned above the first network element may be a base station and the second network element may be a user equipment of a cellular radio telecommunication network.

The step of dividing a range of possible radio channel qualities between the two network elements into a fixed number of quality classes may be carried out for instance by the first network element or by the second network element. After dividing the radio channel quality range the corresponding executing network element may transmit the thereby resulting classification to the other network element.

The step of (a) measuring the quality of the radio channel between the two network elements and the step of (b) selecting one quality class out of the fixed number of quality classes based on the measured quality of the radio channel is preferably performed by the second network element.

The first and/or the second network element may be equipped with an antenna device, which comprises at least two antenna elements. According to the principles of the known MIMO technology these antenna elements may be used for transmitting and/or for receiving radio data signals. These antenna elements may allow the respective network element to communicate with the other network element by utilizing a diversity transmission mode and/or a spatial multiplexing transmission mode.

According to a further aspect of the invention there is provided a computer program for transmitting a channel quality information between a second network element and a first network element of a radio telecommunication network. The computer program, when being executed by a data processor, is adapted for controlling the method as set forth in any embodiment described above.

As used herein, reference to a computer program is intended to be equivalent to a reference to a program element and/or a computer readable medium containing instructions for controlling a computer system to coordinate the performance of the above described method.

The computer program may be implemented as computer readable instruction code in any suitable programming language, such as for instance JAVA, C++, and may be stored on a computer-readable medium (removable disk, volatile or non-volatile memory, embedded memory/processor, etc.). The instruction code is operable to program a computer or any other programmable device to carry out the intended functions. The computer program may be available from a network, such as the World Wide Web, from which it may be downloaded.

The invention may be realized by means of a computer program respectively software. However, the invention may also be realized by means of one or more specific electronic circuits respectively hardware. Furthermore, the invention may also be realized in a hybrid form, i.e. in a combination of software modules and hardware modules.

It has to be noted that embodiments of the invention have been described with reference to different subject matters. In particular, some embodiments have been described with reference to method type claims whereas other embodiments have been described with reference to apparatus type claims. However, a person skilled in the art will gather from the above and the following description that, unless other notified, in addition to any combination of features belonging to one type of subject matter also any combination between features relating to different subject matters, in particular between features of the method type claims and features of the apparatus type claims is considered as to be disclosed with this application.

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

DETAILED DESCRIPTION

The illustration in the drawing is schematically.

Figure 1:
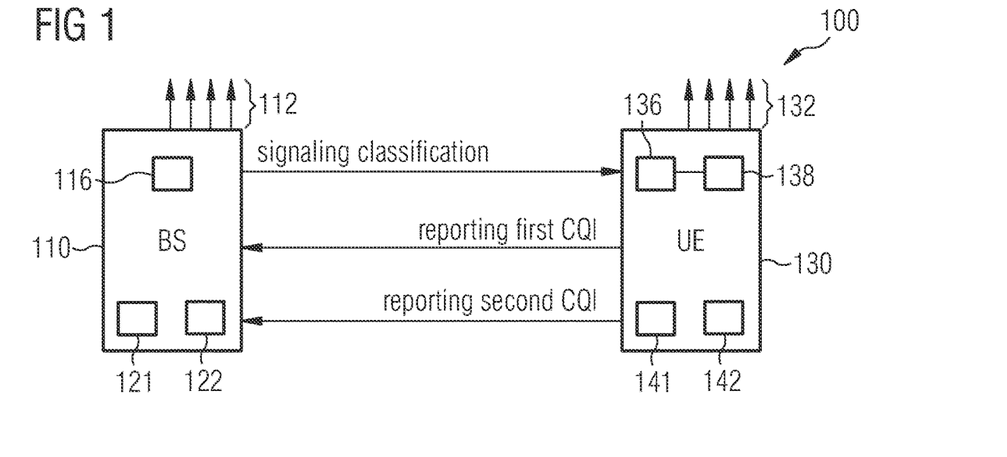
FIG. 1 shows a telecommunication network comprising a base station and a user equipment, which are exchanging channel quality information according to an embodiment of the invention.

FIG. 1 shows a telecommunication network 100 comprising a base station (BS) 110 and a user equipment (UE) 130. Both the BS 110 and the UE 130 comprise an antenna array each having four antenna elements. The antenna array, which is assigned to the BS 110, is denominated with reference numeral 112. The antenna array, which is assigned to the UE 130, is denominated with reference numeral 132. Of course, also antenna arrays having a smaller or a higher number of antenna elements can be used.

According to the principles of Multiple Input Multiple Output (MIMO) communication technique, 4×4 spatial different radio channels extend between the BS 110 and the UE 130. In order to figure out which radio channel is or which radio channel are most appropriate for a reliable and an effective data transfer between the BS 110 and the UE 130, the BS 110 transmits in a known manner a so called pilot signal over each of the radio channels. The UE 130 measures the quality and in particular the signal strengths of the received pilot signals and reports the measurement results to the BS 110. Based on the reported measurement results the BS 110 can decide what channel or what channels should be used for a subsequent data transmission between the BS 110 and the UE 130.

In this application with respect to the signaling overhead a highly effective method for transmitting this measurement information is described.

As can be seen from FIG. 1, the BS 110 comprises a unit for dividing a range of possible radio channel qualities between the BS 110 and the UE 130 into a fixed number of quality classes. The fixed number may be for instance 2, 4 or 8.

The dividing unit 116 outputs a classification framework, which is signaled to the UE 130. This is indicated in Figure by the arrow denominated "signaling classification". According to the embodiment described here the corresponding signaling classification message is transmitted via a radio channel extending between the antenna arrays 112 and 132.

The base station receives this signaling message and feds the corresponding classification into a selection unit 138. The selection unit 138 is coupled to a measurement unit 136, which, as has already been described above, carries out or at least controls known measurement procedures of the UE 130. Thereby, in particular the signal strength of various pilot signals, which are transmitted from the BS 110 via different radio channels, are measured. For each measurement value, which is obtained from these measurement procedures, the selection unit 138 selects one quality class out of the fixed number of quality classes based on the measured quality of the radio channel.

The UE 130 further comprises a first transmitting unit 141 for transmitting to the BS 110 a first channel quality information (CQI) being indicative for the selected quality class. This is depicted in FIG. 1 with the arrow denominated with "reporting first CQI".

Further, the UE 130 comprises a second transmitting unit 142 for transmitting to the BS 110 a second CQI being indicative for the measured quality within the limits of the selected quality class. This is depicted in FIG. 1 with the arrow denominated with "reporting second CQI".

Accordingly, the BS 110 comprises a first receiving unit 121 for receiving from the UE 130 the first CQI and a second receiving unit 122 for receiving from the UE 130 the second CQI.

It has to be mentioned that in an alternative embodiment, which is not described here in more detail, also the UE can divide the range of possible radio channel qualities between the BS and the UE. In this case the dividing unit 116 is situated in the UE and there is of course no need for transmitting the "signaling classification" from the BS to the UE. In other words, the UE could choose its CQI classification granularity by itself.

Figure 2:
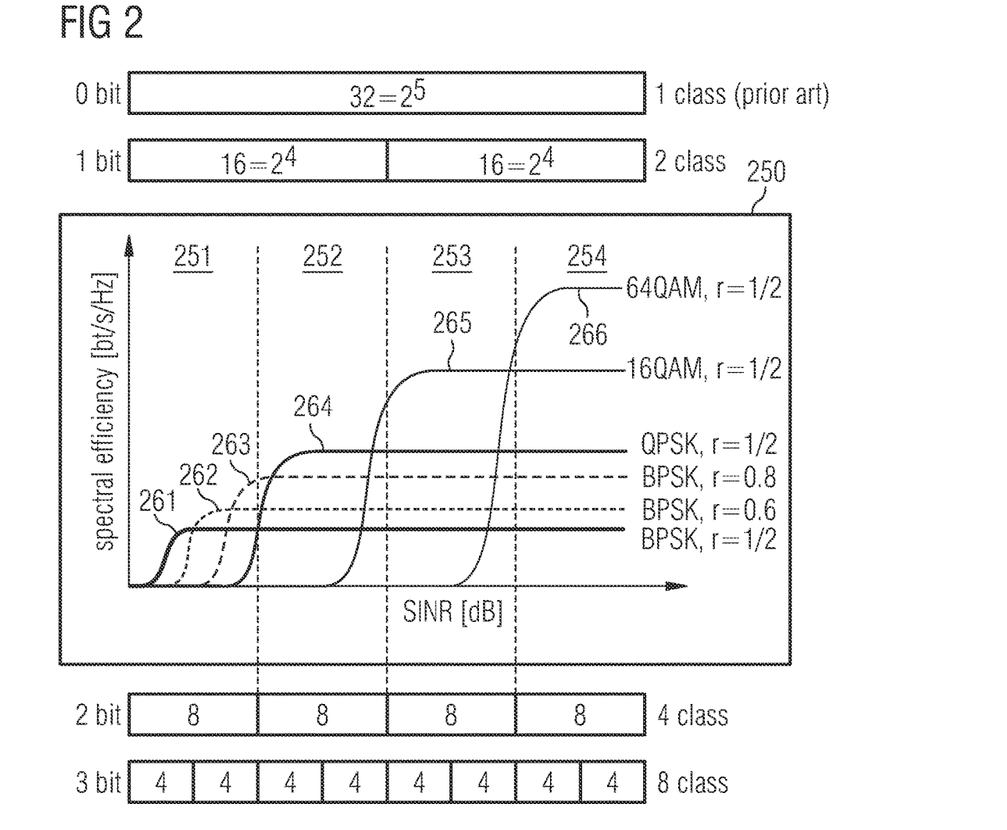
FIG. 2 shows a diagram illustrating the classification of different channel quality information messages in accordance with the invention.

FIG. 2 shows a diagram illustrating the classification of different channel quality information messages in accordance with the invention. According to the embodiment described here the radio channel quality between the BS and the UE is given by the Signal to Interference and Noise Ratio (SINR).

In the top there is depicted a one-class segmentation of all possible radio channel qualities between the BS and the UE. This segmentation corresponds to known feedback procedures, wherein there is only one single class. This is the same as if no CQI classification (0 bits for the CQI class) is used. In accordance with current standardizations $2^5=32$ bits are then used for each CQI.

In the second scheme depicted in the second row of FIG. 2 the SINR range is divided into two classes. Consequently, one bit is used for identifying whether a CQI value belongs to the first or to the second class. In this application this bit is assigned to the first channel quality information. Further consequently, $2^4=16$ gradations or levels can then be used for each CQI. In this application 4 bits are assigned to the second channel quality information.

Beneath the two-class scheme there is depicted a four-class scheme. Accordingly, two bits are used for the first channel quality information identifying a particular CQI class and respectively $2^3=8$ gradations or levels remain for each second channel quality information within the framework of the respective CQI class.

At the bottom of FIG. 2 there is depicted an eight-class scheme. Three bits have to be used for the first channel quality information identifying a particular CQI class and respectively $2^2=4$ gradations or levels remain for each second channel quality information within the framework of the respective CQI class.

In FIG. 2, in between the two-CQI class scheme and the four-CQI class scheme there is depicted a diagram 250 showing for the four-CQI class scheme exemplarily different modulation and coding schemes (MCS), each being defined by a modulation mode quantization scheme (BPSK, QPSK, 16QAM, 64 QAM) and a code rate ($r=\frac{1}{2}$, $r=0.6$, $r=0.8$). For the technical meaning of the different modulation mode quantization schemes and the different code rates reference is made to the description above.

The diagram 250 depicts for a particular UE being served by the BS the spectral efficiency of the data throughput as a function of the SINR. The spectral efficiency is given in the unit bits per second and hertz. The SINR is given in the unit decibel.

In the diagram 250, a first SINR region of low SINR values is denominated with reference number 251, a second SINR region of SINR values is denominated with reference number 252, a third SINR region of SINR values is denominated with reference number 253 and a fourth SINR region of high SINR values is denominated with reference number 254.

As can be seen from the diagram 250, within the first SINR region 251 the density of possible MCSs is quite high. Depending on the precise SINR value of the radio channel between the BS and the UE a first MCS 261, a second MCS 262 or a third MCS 263 yield the best spectral efficiency. It has to be mentioned that also further MCS, which for the sake of clarity are not depicted in the diagram 250, may be taken into account. Therefore, in order to achieve the maximum spectral efficiency for each SINR value, in the region 251 all available 8 bits should be used in order to identify the optimal MCS.

In the second SINR region 252, the density of possible MCSs decreases. If only the MCSs, which are depicted in the diagram 250, are considered, only the third MCS 263 and a fourth MCS 264 may be taken into account. Therefore, if within the second SINR region feedback information between the BS and the UE has to be exchanged, it should be sufficient if not all of the available 8 bits are used. A more course feedback information within the second SINR region 252 will not affect the achievable spectral efficiency to the same extend as an imprecise feedback information given in the first SINR region 251.

In the higher SINR range (SINR regions 253 and 254) the density of possible MCSs further decreases. As a consequence, when knowing only the first channel quality information being indicative for the selected quality class (SINR region 253 or SINR region 254) no or at least only a very coarse second channel quality information being indicative for the respective SINR value will be needed in order to identify an appropriate MCS yielding to a maximum spectral efficiency. As can be seen from the diagram 250, in the embodiment described here a fifth MCS 265 is used for SINR values of the third SINR region 253 and a sixth MCS 266 is used for SINR values of the fourth SINR region 254.

By not using all bits for CQI being assigned to the better SINR regions (corresponding to higher quality classes or higher CQI classes), the overall feedback overhead can be reduced significantly. This holds in particular for signaling CQI in MIMO communication systems, wherein feedback information hat to be given not only for different Physical Resource Blocks (PRB) but in addition also for spatially radio channels extending between different antenna elements of the BS and the UE.

It has to be mentioned that the described CQI quantization scheme may also be carried out in an adaptive manner. This means the BS can decide on the number of CQI feedback classes and therefore can change the feedback granularity depending on the number of UEs (multi user scenario) in the telecommunication system and on their respective channel condition.

It should be noted that the term "comprising" does not exclude other elements or steps and "a" or "an" does not exclude a plurality. Also elements described in association with different embodiments may be combined. It should also be noted that reference signs in the claims should not be construed as limiting the scope of the claims.

LIST OF REFERENCE SIGNS 100 telecommunication network
110 first network element/base station
112 antenna array
116 dividing unit
121 first receiving unit
122 second receiving unit
130 second network element/user equipment
132 antenna array
136 measurement unit
138 selection unit
141 first transmitting unit
142 second transmitting unit
250 diagram
251 first SINR region
252 second SINR region
253 third SINR region
254 fourth SINR region
261 first Modulation and Coding Scheme
262 second Modulation and Coding Scheme
263 third Modulation and Coding Scheme
264 fourth Modulation and Coding Scheme
265 fifth Modulation and Coding Scheme
266 sixth Modulation and Coding Scheme

The invention claimed is:

1. A method comprising:
dividing a range of possible radio channel qualities between two network elements, a first network element and a second network element, of a radio telecommunication network into a fixed number (n) of quality classes, measuring quality of a radio channel between the two network elements, selecting one quality class out of the fixed number of quality classes based on the measured quality of the radio channel,
in a first transmission, transmitting from the second network element to the first network element a first channel quality information being indicative for the selected quality class, and
in a second transmission which is distinct from the first transmission, transmitting from the second network element to the first network element a second channel quality information being indicative for the measured quality within the limits of the selected quality class, wherein the second channel quality information comprises a quality resolution within the limits of the selected quality class, and wherein the quality resolution depends on the selected quality class.

2. The method as set forth in claim 1, wherein for a first measured radio channel quality, which is poorer than a second measured radio channel quality, the quality resolution is higher than the quality resolution for the second measured radio channel quality.

3. The method as set forth in claim 1, further comprising:
transmitting from the second network element to the first network element at least one further second channel quality information being indicative for the measured quality within the limits of the selected quality class, wherein each further second channel quality information represents a different radio transmission resource.

4. The method as set forth in claim 3, wherein the second channel quality information and the further second channel quality information are assigned to a predefined number of the best radio transmission resources between the two network elements.

5. The method as set forth in claim 1, wherein dividing a range of possible radio channel qualities between the two network elements into a fixed number (n) of quality classes is performed by the first network element and wherein the method further comprises:
signaling a classification resulting from the performed division from the first network element to the second network element.

6. The method as set forth in claim 5, wherein selecting one quality class out of the fixed number of quality classes based on the measured quality of the radio channel is performed by the second network element.

7. The method as set forth in claim 1, wherein dividing a range of possible radio channel qualities between the two network elements into a fixed number (n) of quality classes is performed by the second network element and selecting one quality class out of the fixed number of quality classes based on the measured quality of the radio channel is performed by the second network element.

8. The method as set forth in claim 1, further comprising
assigning a modulation mode quantization scheme to the selected quality class and/or
assigning a code rate to the to the selected quality class.

9. The method as set forth in claim 1, wherein the first network element is a base station of the radio telecommunication network or the second network element is a user equipment of the radio telecommunication network or both the first network element is a base station of the radio telecommunication network and the second network element is a user equipment of the radio telecommunication network.

10. A computer program product comprising a non-transitory computer-readable memory storing instructions for execution by one or more processors, wherein the computer-readable memory includes instructions for performing the method as set forth in claim 1.

11. A first network element comprising one or more processors and one or more memories including computer program code, the one or more memories and the computer program code being configured, with the one or more processors, to cause the first network element to perform at least the following:
receiving from a second network element in a first transmission a first channel quality information being indicative for a selected quality class, which has been selected from a fixed number (n) of quality classes based on a measured quality of a radio channel between the first and the second network elements, wherein a range of possible radio channel qualities between the first and the second network elements is divided into the fixed number (n) of quality classes, and receiving from the second network element in a second transmission which is distinct from the first transmission a second channel quality information being indicative for the measured quality within the limits of the selected quality class,
wherein the second channel quality information comprises a quality resolution within the limits of the selected quality class, and wherein the quality resolution depends on the selected quality class.

12. The first network element as set forth in claim 11, wherein for a first measured radio channel quality, which is poorer than a second measured radio channel quality, the quality resolution is higher than the quality resolution for the second measured radio channel quality.

13. A second network element comprising one or more processors and one or more memories including computer program code, the one or more memories and the computer program code being configured, with the one or more processors, to cause the second network element to perform at least the following:
transmitting to a first network element in a first transmission a first channel quality information being indicative for a selected quality class, which has been selected from a fixed number (n) of quality classes based on a measured quality of a radio channel between the first and the second network elements, wherein a range of possible radio channel qualities between the first and the second network elements is divided into the fixed number (n) of quality classes,
and transmitting to the first network element in a second transmission which is distinct from the first transmission a second channel quality information being indicative for the measured quality within the limits of the selected quality class,
wherein the second channel quality information comprises a quality resolution within the limits of the selected quality class, and wherein the quality resolution depends on the selected quality class.

14. The second network element as set forth in claim 13, wherein the second channel quality information comprises a quality resolution within the limits of the selected quality class, and wherein the quality resolution depends on the selected quality class.

15. The second network element as set forth in claim 14, wherein for a first measured radio channel quality, which is poorer than a second measured radio channel quality, the quality resolution is higher than the quality resolution for the second measured radio channel quality.

* * * * *

UNITED STATES PATENT AND TRADEMARK OFFICE
CERTIFICATE OF CORRECTION

PATENT NO. : 10,128,977 B2
APPLICATION NO. : 13/144577
DATED : November 13, 2018
INVENTOR(S) : Andreas Forck et al.

Page 1 of 1

It is certified that error appears in the above-identified patent and that said Letters Patent is hereby corrected as shown below:

In the Claims

Column 14, Claim 15, Line 1, delete "in claim 14" and insert --in claim 13--.

Signed and Sealed this
Twenty-second Day of October, 2019

Andrei Iancu
*Director of the United States Patent and Trademark Office*